United States Patent [19]

Baldwin

[11] Patent Number: 4,567,792
[45] Date of Patent: Feb. 4, 1986

[54] SAW CHAIN SHARPENING DEVICE
[76] Inventor: Arnold L. Baldwin, Old Peterborough Rd., Jaffrey, N.H. 03452
[21] Appl. No.: 612,141
[22] Filed: May 21, 1984
[51] Int. Cl.⁴ .......................................... B23D 63/10
[52] U.S. Cl. ............................................ 76/36; 33/202
[58] Field of Search ................... 76/36, 31, 74, 25 A; 33/202

[56] References Cited
U.S. PATENT DOCUMENTS

| | | | |
|---|---|---|---|
| 2,440,633 | 4/1948 | Hall | 76/36 |
| 2,822,707 | 2/1958 | Gommel | 76/36 |
| 3,005,362 | 10/1961 | Newman | 76/36 |
| 3,027,784 | 4/1962 | Weatherly | 76/36 |
| 3,055,238 | 9/1962 | Hazzard | 76/36 |
| 3,322,000 | 5/1967 | Newman | 76/36 |
| 3,670,600 | 6/1972 | Arff | 76/36 |
| 3,905,118 | 9/1975 | Ballew | 76/36 |
| 4,404,872 | 9/1983 | Fritz | 76/36 |

Primary Examiner—Roscoe V. Parker
Attorney, Agent, or Firm—George W. Dishong

[57] ABSTRACT

A device for sharpening saw chains while the saw chain is mounted on a chain saw cutting bar. The saw chain sharpening device is designed for use by a chain saw operator at the job site. The device comprises a frame configured to be straddle mounted over the saw chain and removeably clamped to the cutting bar. The frame has mounted thereon at least one pair of diammetrically opposed bushings having an inside diameter to accept a saw file and to permit the file to be slideably moved and axially aligned with the axis of alignment positioned relative to the saw chain so that the saw tooth being filed will be filed at the proper angle. The file guide bushings also provide precise control of the saw file position relative to the saw tooth being sharpened.

16 Claims, 10 Drawing Figures

U.S. Patent   Feb. 4, 1986   Sheet 1 of 2   4,567,792
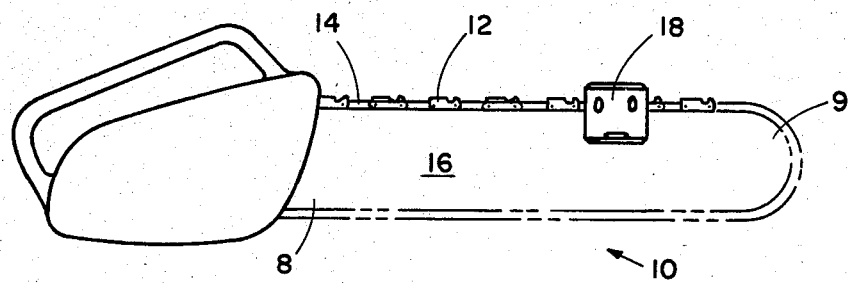
Fig. 1
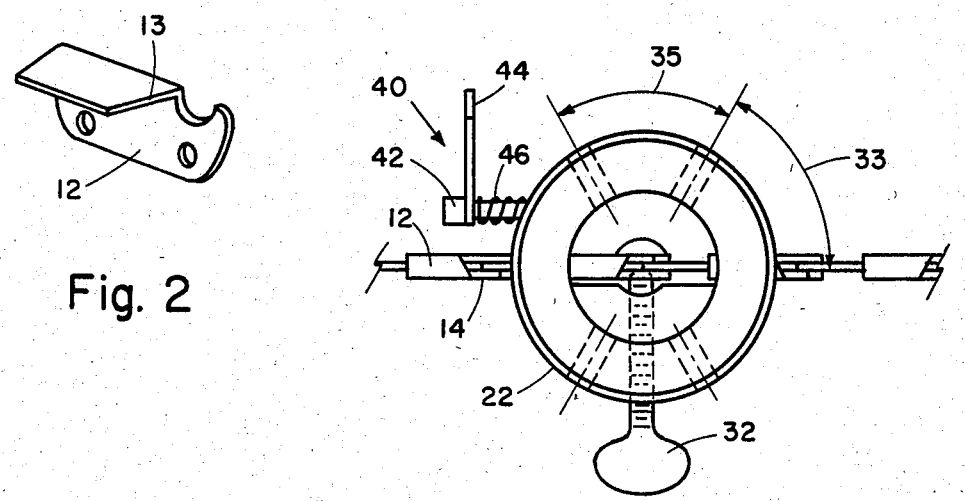
Fig. 2
Fig. 3
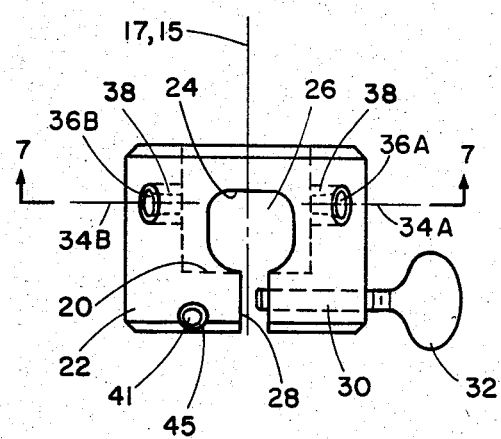
Fig. 4
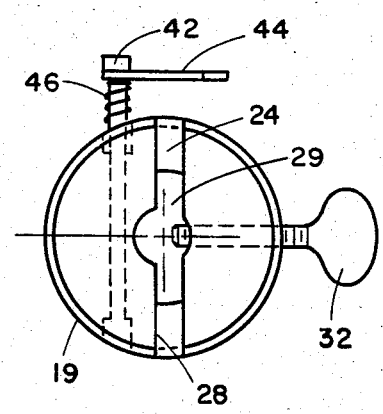
Fig. 5

SAW CHAIN SHARPENING DEVICE

BACKGROUND OF THE INVENTION

This invention generally relates to saw chain sharpening devices and more particularly this invention relates to saw chain sharpening devices where the saw chain being sharpened is mounted on the cutting bar and the operator of a chain saw is at the job site which is frequently in the woods. This device provides for precise and accurate file sharpening of the saw chain by providing precisely aligned file guide bushings which allows the operator of the chain saw to accurately sharpen the saw chain without taking the chain saw to a shop. It is important to note that there are several devices on the market that are within the art of saw chain sharpening. A number of these devices have been patented and are described in U.S. Pat. Nos. 2,440,633; 3,005,362; 3,027,784; 3,055,238; 3,322,000; 3,670,600. The devices defined and claimed in the U.S. Pat. Nos. 3,005,362; 3,670,600; 3,905,118 and 3,322,000 are particularly designed for use in the woods and for use by the chain saw operator. Some of the prior art devices designed for use in the woods have been constructed to simply rest on the cutting bar or on the saw links or otherwise and are not secured to the chain saw. Because the device is not secured to the saw assembly, the saw teeth consequently are not filed consistently with regard to the angle across the cutting edge of the saw tooth and are not consistently filed in a direction which is about 10° to 11° inclined to the horizontal to the vertically directed cutting bar. Those devices designed to provide sufficient accuracy so that the saw chain is properly filed are either very difficult to use by the operator and require special set-up procedures, procedures all of which are difficult and cumbersome, especially in the woods. Also most of the devices which provide for accurate sharpening are expensive and simply not economically feasible for use by the chain saw operator. Because of the cost of these devices, it would be more realistic for the chain saw operator to simply hand file the saw without using anything other than a file. Such filing may result in a saw chain useable until it can be put in the shop for proper sharpening. There are other devices which are less expensive and which are designed for use in the field by the chain saw operator. Although these devices may be low in cost, they generally do not provide the accuracy and the control of the file resulting in a saw chain improperly filed. In summary, saw chain sharpening devices that are currently available and useable in the woods by the chain saw operator are either expensive, cumbersome and difficult to use or they are low cost but fail to provide the control and the positioning of the file in order to properly file the saw chain according to the manufacturer's specifications. Accordingly, it is an object of this invention to provide a saw chain sharpening device which is simple to use and with no adjustments to be made by the chain saw operator. Another object of this invention is to provide a low cost, highly reliable and long lasting device which is useable by the chain saw operator at the work place. A still further object of the invention is to provide a device which is not only simple to use by physically small, light weight and portable. Yet another object of the invention is to provide a device which when straddle mounted on the chain saw and affixed to the cutting bar provides a file guide means for very accurately controlling the file angle relative to the saw chain tooth being filed. Yet another object of the invention is to provide a device having hardened steel bushings diammetrically opposed and having at least one pair of these bushings angularly positioned relative to the cutting bar and the saw chain so that the operator can file sharpen the saw chain to the manufacturer's specifications. The at least one pair of bushings being diammetrically opposed on an axis which is about 30° from an axis which would be normal to the saw chain travel direction that direction being along the cutting bar from the motor end toward the tip end on the top edge of the bar. Further objects and uses of the invention will become apparent after reading the following detailed specification.

BRIEF DESCRIPTION OF THE DRAWINGS

FIG. 1 is a view of a chain saw having the device of this invention mounted thereon.

FIG. 2 is a view of a saw tooth of a saw chain.

FIG. 3 is a top view of the saw chain sharpening device straddle mounted over the saw chain and clamped onto the cutting bar.

FIG. 4 is a side view of the saw chain sharpening device viewing in a direction along the cutting bar toward either the cutting bar engine end or cutting bar tip end.

FIG. 5 is a bottom view of the device of this invention.

DETAILED DESCRIPTION OF THE INVENTION

Figure 6:
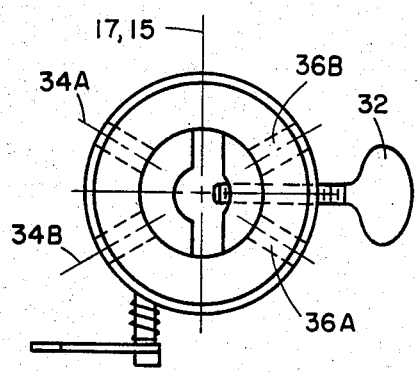
FIG. 6 is a top view of the saw chain sharpening device showing a bushing exploded out of the device.
Figure 7:
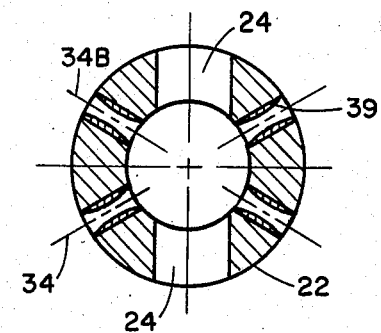
FIG. 7 is a view taken on section lines 7—7 of FIG. 4.
Figure 8:
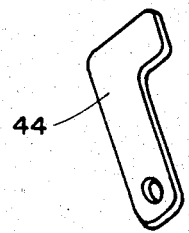
FIG. 8 is a perspective view of the gauge tab.
Figure 9:
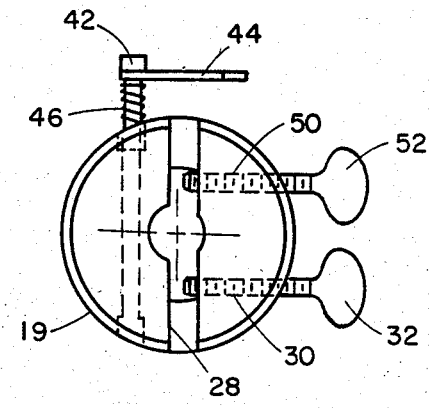
FIG. 9 is similar to the embodiment shown in FIG. 5 but showing two clamping screws.
Figure 10:
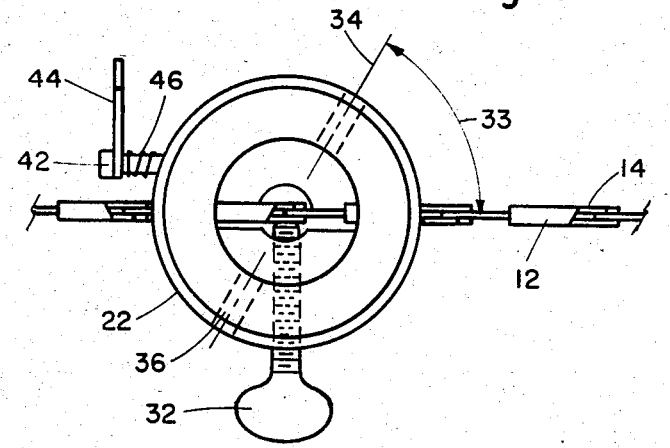
FIG. 10 is a view of the device with one pair of diammetrically opposed file guide means.

Referring to FIG. 1, the saw chain sharpening device 18 is straddle mounted over the saw chain 14, the saw chain 14 being properly mounted on the cutting bar 16 of the chain saw 10. In the particular embodiment of the device depicted by the drawing figures, the device 18 is attached to the cutting bar 16 by means of a clamping screw 32 and by means of a cutting bar contact surface 28 both of which are secured against the cutting bar 16. The combination of the surface against the cutting bar 28 and the screw device 32 that is used to tighten the sharpening device 18 on the cutting bar 16 causes the sharpening device 18 to be removably attached to the cutting bar 16. Further, it allows the operator to mount the saw chain sharpening device 18 on the bar 16 in any position convenient from the engine end 8 of the cutting bar 16 to the tip end 9 of the cutting bar 16. The saw chain sharpening device 18 is positioned vertically, that is in a direction going from above the cutting bar to below the cutting bar, by means of a top registration surface 24 on the top of the cavity inside of the saw chain sharpening device 18. The saw chain sharpening device 18 is positioned by the operator to not rest on the top surface 13 of the saw teeth 12 but to be just clear of the top surface 13 of the teeth 12, the clearance which can be set by inserting a piece of paper or any such material such as a book match cover to allow this clearance. This clearance is defined as the space formed between the top surface 13 of the teeth 12 and the top registration surface 24. The purpose of this clearance is, to allow the saw chain 14 to freely pass through the saw chain sharpening device 18 and particularly through the saw chain passage way 26. After the operator securely attaches the saw chain sharpening device 18 to the cutting bar 16 in proper vertical position, he then inserts a round file through the guide means 36 in walls 22 of the saw chain sharpening device 18. The bushings 38, which are the guide means for the file, allow for the file to be slideably guided across the cutting surface 11 of the saw tooth 12. When the file is inserted through the guide means 36, the saw chain 14 is carefully drawn toward the tip end 9 of the cutting bar 16 until it touches the file. When the operator has drawn the saw chain 14 toward the tip end 9 of the cutting bar 16 until the file is engaged against one of the saw teeth 12, the operator then pushes the file forward through the file guide bushings 38. While pushing the file forward the operator should rotate the file. This practice is very important and results in a sharper filed tooth. While pushing and rotating the file, modest pressure is caused between the tooth 12 and the file by applying a slight pull of the saw chain 14 toward the tip end 9 of the bar 16. The pull is released when the file is pulled back after the push stroke of the file. This process is repeated until the tooth is properly filed. The file is then drawn back through the saw chain sharpening device 18 so that it is clear of the saw chain 14. The saw chain 14 is then drawn back toward the tip end 9 of the cutting bar 16 until the next like tooth 12, in other words, right hand or left hand tooth is again within the saw chain sharpening device. (There are so called right hand and left hand teeth alternately affixed to the chain to form the saw chain). The file is then reinserted through the two aligned file guide holes 36 or bushings 38 and the saw chain 14 is then pulled toward the tip end 9 of the cutting bar 16 until it again engages with the file. The operator then, as he previously did for the prior tooth, continues to draw the file back and forth until the tooth 12 is properly sharpened all the while maintaining a slight degree of pull on the chain 14 toward the tip end 9 of the cutting bar 16 on the forward stroke and releasing the pull on the back stroke. This process is continued until all the like direction teeth, in other words, right hand or left hand teeth have been sharpened. If the saw chain sharpening device 54 is one as depicted in FIG. 10 having only one pair of diammetrically opposed alignment holes 56 for the file, the device must be removed from the cutting bar, rotated 180° and remounted on the cutting bar. The file guide alignment holes 56 will then be in proper angular position relative to the cutting bar 16 to file the other direction teeth. The process is again repeated as was done before, that is applying the filing technique as previously described. A very important feature of the invention is that the operator is not able to alter the angular position of the file in any way. The file position is rigidly maintained because the file passes directly through a pair of hardened bushings 38 or file guide alignment holes 36 positioned in the device 18 according to the manufacturer's specifications. The result being that the saw chain being filed must be filed at exactly that angle. There is no adjustment by the operator. There is no way the operator filing the saw chain 14 can file it in any way other than at the prescribed angle. The very unique combination of this invention provides for some beneficial and unexpected results. Saw chain 14 should be filed at an angle of about 30° with a perpendicular to the saw chain 14 and saw chain bar 16. The positioning of the file guides 36 on the frame 19 provides this angle. In addition however, an effective angle of about 10° to about 11° above a horizontal and in the direction in which the file is pushed is also desired. While this angle of about 10° to about 11° is not designed into the device 18, because of the uniqueness of the design, this angle results and is a consequence of a "roll-over" of the saw chain 14 which is caused by the filing action on the push stroke. All that is required is that the saw chain 14 be tightened onto this cutting bar 16 (using the tension adjustment on the saw chain 10) so that it freely moves on the bar 16 without significant slack or looseness. This overall result is completely unexpected and unobvious. It should be noted that in prior art devices the saw chain is, by design, rigidly positioned while filing. In addition, prior art devices basically do not provide a device where the operator can rotate the file on the push stroke—a procedure very necessary in order to obtain a finely sharpened edge on the tooth. The file rotation is not only essential to obtaining a sharp edge on the saw tooth 12 but the rotation also results in an even wear of the sharpening file. This invention 18 allows for such rotation and yet provides a means for controlling the critical angles while filing the saw chain 14.

Having described how the device of this invention is used, the device itself and in particular, the preferred embodiment of the device itself will now be described.

The frame means of the preferred embodiment is a cylindrical member 19 and is essentially made from a cylindrical rod having a length sufficiently long so as to be able to be mountable on the cutting bar 16 over the top of the saw chain 14.

The cylindrical rod has a hole drilled from a top surface 21, the top surface 21 being that surface which will be uppermost from the top surface 13 of the saw teeth 12 when the device is mounted on the saw chain 14 and cutting bar 16. The hole is drilled partially through the cylindrical rod thereby creating a cylindrical cavity inside the rod, the cylindrical cavity having interior walls and a bottom, thus creating a lower wall 20 of the inner cavity of the cylindrical rod. A slot 29 is cut through the lower wall 20 of the cavity. The cylindrical member 19 having a cavity therein now can be described as having cylindrical walls 22 with a wall thickness equal to approximately the difference between the outer radius of the rod and the radius of the cavity within the rod and further, it also will have a bottom surface or a lower wall 20 with a slot 29 cut therethrough across the full outer diameter or twice the outer radius of the cylindrical member 19. One wall of this slot 29, the cutting bar contacting surface 28, will be the wall against the cutting bar 16 of the chain saw 10 when the device 18 is mounted on the cutting bar 16. The cutting bar contacting surface 28 is positioned so that when the device 18 is mounted on the cutting bar 16, the centerline 15 of the cutting bar will correspond to the centerline 17 of the cylindrical rod. The width of the slot 29 is of sufficient width to allow the sharpening device 18 to be able to be straddle mounted over top of the saw chain 14 down onto the cutting bar 16. A hole 30 is drilled and threaded which is positioned so as to be central to the slot 29 in the lower wall 20 of the cylindrical member 19 and in opposition to the cutting bar contacting surface 28. The axis of the threaded hole 30 being on a radial line of the cylindrical member 19 and perpendicular to the slot 29. The combination of the cutting bar contact surface 28 opposite the threaded hole 30 and the clamping screw 32 mounted in the threaded hole 30 serves as the clamping means which secures the saw chain sharpening device 18 onto the cutting bar 16. A saw chain passage way 26 is cut in the cylinder walls 22 of the cylindrical member 19 on a radial line that is parallel to the slot 29 and about perpendicular to the threaded hole 30 and positioned above the slot 29 and above the lower wall 20 having a configuration so as to allow the saw chain 14 to pass through the cylinder walls 22 without touching them. The top registration surface 24 of the saw chain passage way 26 is positioned relative to the slot 29 so that when the saw chain sharpening device 18 is straddle mounted on the cutting bar 16 and over the saw chain 14, the top registration surface 24 of the saw chain passage way 26 will essentially rest on the top surface 13 of the saw teeth 12. In practice, a shim would be placed over the saw teeth 12 so that when the saw chain sharpening device 18 is mounted over the saw chain 14, the shim provides a clearance for the saw chain teeth 12 to pass through the saw chain passage way 26 without engaging or touching this top registration surface 24. Two pair of diammetrically opposed holes 36 are drilled in the cylinder walls 22 on radial lines called axes of alignment 34 which are angularly disposed about 60° from the radial line for the saw chain passage way 26 which radial line is the same as the cutting bar centerline 15. The two axes 34A and 34B of the two pair of diammetrically opposed holes 36A and 36B will intersect on a plane which plane is parallel to the cutting bar contacting surface 28 opposite the threaded hole 30 in the slot 29 and coincident with a plane containing the cutting bar centerline 15. Further, each axis 34A and 34B of the diammetrically opposed holes 36A and 36B would have an angle 35 between them of about 60° and the two axes 34A and 34B would lie in a plane said plane being horizontal and approximately perpendicular to the plane coincident with the cutting bar centerline 15. If the two pair of diammetrically opposed hole 36A and 36B are themselves to be used as the file guide means, the interior walls of each of these four holes would be radiused throughout the length of the holes to allow the round file to easily insert through the holes 36 without engaging either the front or rear edges of the holes 36. In the preferred embodiment where the file guide means are hardened steel bushings 38, the holes 36 drilled in the cylinder walls 22 are of a diameter about equal to the outer diameter of the hardened bushings 38. The inner diameter 39 of the bushings 38 are to accommodate the proper file diameter for the saw chain 14 being sharpened. In the embodiment using the hardened steel bushings 38, the bushings 38 are press mounted in the file guide holes 36 that are drilled in the cylinder walls 22. The inner diameter 39 of the bushings 38 varies throughout the length of the bushing 38, the diameter being larger at each end and smallest toward the center of the bushing 38. This variation appears as a radius of curvature in the axial direction 34A and 34B of the bushing 38 and allows the file to slide more easily through the bushings 38. An additional feature of the saw chain sharpening device 18 is an adjustable gauge 40 for filing each tooth 12. The adjustable gauge 40 is mounted on the cylindrical member 19 near the lower wall 20 of the cylindrical member 19 on a chord which would be essentially parallel to the cutting bar contacting surface 28 and on the side of the cylindrical member 19 opposite the threaded hole 30 and clamping screw 32. The adjustable gauge 40 comprises a tab like device 44 which is positioned on a thumb screw 42 and held by a compression spring 46 so that the operator who is in the process of filing a saw chain 14 can adjust the position of the tab 44 so that it will contact either a forward or a leading edge of the tooth or the trailing edge of a tooth not being sharpened. After filing the tooth which is in the process of being sharpened by a predetermined amount, either the tooth just prior sharpened or the next tooth to be sharpened (depending on the operator) will come into contact with the tab 44 on the file gauge 40. At the time contact is made with the other tooth, the tooth being sharpened has been filed by about an equal amount to the prior tooth that was sharpened. In this way the adjustable gauge 40 provides a means for filing each tooth on the saw chain 14 by approximately the same amount. The saw chain sharpener 18 can be fabricated using any material which has sufficient strength so that the sharpener will stay in proper position on the chain saw. The material also should be easily machineable. Materials such as stainless steel, steel, aluminum, teflon, or nylon are examples of material which can be used to fabricate the sharpener 18. The materials listed are for illustration only and the list is not necessarily complete.

Having described the invention, it will be apparent to those skilled in the art that various modifications may be made thereto without departing from the spirit and scope of this invention as defined in the appended claims.

What is claimed is:

1. A device for sharpening saw chains, the saw chain mounted upon a chain saw cutting bar said device comprising:
    a frame means configured to straddle mount over said saw chain, said frame means having a top registration surface;
    a clamping means to removeably attach said frame means to said cutting bar;
    said frame means having at least one pair of file guide means said pair of file guide means being in axial alignment and having an axis of alignment said axis of alignment being disposed horizontally to said cutting bar where said cutting bar is vertically disposed, said axis of alignment being angularly disposed at a predetermined angle relative to a plane parallel to said cutting bar and said top registration surface is in near contact with a top surface of a tooth of said saw chain thereby positioning a round file placed in said at least one pair of file guide means for proper sharpening of said saw tooth of said saw chain and said near contact of said top registration surface allowing said saw tooth being sharpened to tilt between about 8° to about 12°.

2. A device for sharpening saw chain according to claim 1 wherein said frame means has two pair of file guide means each having axes of alignment horizontal to said cutting bar and said axes of alignment having a predetermined angle therebetween and said each of two axes intersecting a vertical plane parallel with said cutting bar and containing a center line of said cutting bar.

3. A device for sharpening saw chains according to claim 1 wherein said at least one pair of said file guide means are bushings rigidly mounted in said frame means and said bushings having a hole therethrough with a diameter at least greater than said file diameter.

4. A device for sharpening saw chains according to claim 3 wherein said bushings are hardened steel and said hole therethrough having a radius of curvature along the axis of said bushing hole.

5. A device for sharpening saw chain according to claim 2 wherein said two pair of said file guide means comprises bushings rigidly mounted in said frame means and having a hole therethrough with a diameter at least greater than said file diameter.

6. A device for sharpening saw chains according to claim 5 wherein said bushings are hardened steel and said hole therethrough having a radius of curvature along the axis of said bushing hole.

7. A device for sharpening saw chains according to claim 1 further comprising an adjustable gauge attached to said frame means said gauge positioned to contact a tooth of said saw chain when said saw tooth being sharpened has been sharpened to an amount determined by said gauge.

8. A device for sharpening saw chains according to claim 2 further comprising an adjustable gauge attached to said frame means said gauge positioned to contact a tooth of said saw chain when said saw tooth being sharpened has been sharpened to an amount determined by said gauge.

9. A device for sharpening saw chains according to claim 3 further comprising an adjustable gauge attached to said frame means said gauge positioned to contact a tooth of said saw chain when said saw tooth being sharpened has been sharpened to an amount determined by said gauge.

10. A device for sharpening saw chains according to claim 9 wherein said bushings are hardened steel and said hole therethrough having a radius of curvature along the axis of said bushing hole.

11. A device for sharpening saw chains according to claim 5 further comprising an adjustable gauge attached to said frame means said gauge positioned to contact a tooth of said saw chain when said saw tooth being sharpened has been sharpened to an amount determined by said gauge.

12. A device for sharpening saw chains according to claim 11 wherein said bushings are hardened steel and said hole therethrough having a radius of curvature along the axis of said bushing hole.

13. A device for filing saw teeth of a saw chain while said saw chain is mounted on a chain saw cutting bar said device comprising:
- a cylindrical member having an outer radius and having a main cavity therein said main cavity having an inner radius less than said outer radius thereby creating a cylinder wall having a thickness substantially equal the difference between said outer radius and said inner radius;
- a lower wall of said main cavity said lower wall having a predetermined thickness and having a slot therethrough the length of said slot being equal to two times said outer radius of said cylindrical member and a slot width sufficient to fit over said saw chain and having a threaded hole in said lower wall aligned on a radial line about perpendicular to said slot with a screw means inserted in said threaded hole;
- a saw chain passageway cut in said cylinder wall and on a radial line about perpendicular to said radial line for said threaded hole and about parallel to said slot and disposed above said slot and above said lower wall to allow said saw chain to pass through said cylinder walls, said saw chain passageway having a top registration surface to be proximate to a top surface of said saw teeth by a shim spacer amount;
- two pair of holes in said cylinder walls and on radial lines angularly disposed about 60 degrees from said radial line for said saw chain passage way, each of said two pair of holes being diammetrically opposed and in axial alignment and having hardened bushings rigidly mounted therein said bushings having an inside bushing diameter at least greater than a file diameter said file used to file said saw teeth and said axes of alignment of each of said pair of bushings having a predetermined angle therebetween and both axes contained in a horizontal plane perpendicular to a vertical plane parallel with said cutting bar and containing a centerline of said cutting bar and said both axes intersecting on said vertical plane.

14. A device according to claim 13 further comprising a means for adjustably gauging when said saw tooth being sharpened has been sharpened to an amount determined by said gauge, said means for adjustably gauging being attached to said cylindrical member and positioned to contact a tooth of said saw chain.

15. A device according to claim 14 wherein said means for adjustably gauging comprises a screw means screwed into said cylindrical member having an axis along a chord essentially parallel to said slot and through said lower wall opposite said threaded hole used for clamping; a coil spring compression mounted on said screw means; and a tab rotatably mounted on said screw means and held by said spring compression in said position to contact said tooth.

16. A device according to claim 13 wherein said lower wall has two threaded holes therein with two clamping screws inserted therein, said two threaded holes having axes positioned on chords of said cylindrical member said chords being essentially perpendicular to said slot and each chord about one third distance from a tangent line said tangent line being tangent to said cylindrical member at said slot ends.

* * * * *